United States Patent [19]

Mai

[11] 4,429,404
[45] Jan. 31, 1984

[54] FSK DATA OPERATED SWITCH

[75] Inventor: Don L. Mai, Garland, Tex.

[73] Assignee: Rockwell International Corporation, El Segundo, Calif.

[21] Appl. No.: 359,381

[22] Filed: Mar. 18, 1982

[51] Int. Cl.³ ............................................. H04L 27/14
[52] U.S. Cl. ........................................ 375/76; 375/88; 375/104; 307/350; 328/146
[58] Field of Search ................. 375/5, 10, 76, 88, 104; 307/350, 351, 354; 328/115–117, 146–148

[56] References Cited

U.S. PATENT DOCUMENTS

| | | | |
|---|---|---|---|
| 3,214,700 | 10/1965 | Hook | 375/76 |
| 3,769,591 | 10/1973 | Brown et al. | 375/76 |
| 3,999,083 | 12/1976 | Bumgardner | 328/147 |
| 4,157,509 | 6/1979 | Zielinski | 375/76 |

Primary Examiner—Jin F. Ng
Attorney, Agent, or Firm—V. Lawrence Sewell; H. Fredrick Hamann; Roger N. Chauza

[57] ABSTRACT

A circuit for detecting data such as FSK data which is not amplitude modulated. The circuit employs detectors for detecting the frequency domain characteristics, time domain characteristics and amplitude characteristics of the data signals so that a precise indication of the presence or absence of such data signals can be made. Further provided is a threshold control circuit which can override the indication of the presence or absence of data signals irrespective of whether such signals are in fact present or absent.

15 Claims, 3 Drawing Figures

FSK DATA OPERATED SWITCH

BACKGROUND OF THE INVENTION

The invention relates generally to frequency detection circuits, and more particularly to circuits for detecting the presence of transmitted data in the form of Frequency Shift Key (FSK) data.

It is highly advantageous to utilize the telephone system as a transmission medium for communicating FSK-type data. Such data, having frequencies falling within the voice band, is easily accommodated by telephone switching systems.

While data information transmission over land lines is as susceptible to noise, transient voltages and power line AC interferences as voice signals, the need to reproduce the data signals is significantly more critical. This is particularly true because the ramifications of the absence or addition of a data pulse in a data transmission may render the data wholly invalid. This is not the case with voice signal transmission.

It is a general practice of FSK data transmission to utilize a data operated switch at the receiving end to establish a standard by which data information can be distinguished from electrical noise, spikes, or the like. Prior art methods of establishing such a standard consist of detecting the amplitude of the signals appearing on the line. Electrical energy, i.e. amplitudes, above a predetermined level would be considered as data information. Those signals falling below such a level, whether data information or noise, would be disregarded.

A more accurate approach employs a filter which filters the electrical energy to remove unwanted frequencies, and then makes a similar amplitude level comparison to determine the energy content of the signal.

The drawback of both such approaches is that large amplitude transient energy spikes pose a problem insofar as the spikes can rise to the data information amplitude and cause the filter to "ring" at a frequency within the filter bandwidth thereby appearing as data information.

SUMMARY OF THE INVENTION

In broad terms, the present invention employs circuitry which is sensitive to the frequency and time domain characteristics of the data signals, and also circuitry which is sensitive to the amplitude characteristics of the data whereby FSK data signals can be more precisely distinguished from accompanying interference signals.

More particularly, the preferred embodiment of the invention employs a filter for eliminating undesired frequencies, and a detector which is sensitive to the duration of time the transmitted energy is present. In this manner, the determination of the presence of FSK data is based upon the presence of energy within a specified frequency band, plus the energy being present for a predetermined duration of time.

The present invention further includes a comparator for comparing a threshold voltage with the filtered FSK signal amplitudes so that a final determination of the presence of FSK data can be made based upon amplitude characteristics.

It will be seen from the disclosure which follows that the circuitry of the invention is particularly flexible and versatile in application. This versatility affords one to emphasize any of the frequency, time of amplitude characteristics of the data signals.

DETAILED DESCRIPTION OF THE INVENTION

Figure 1:
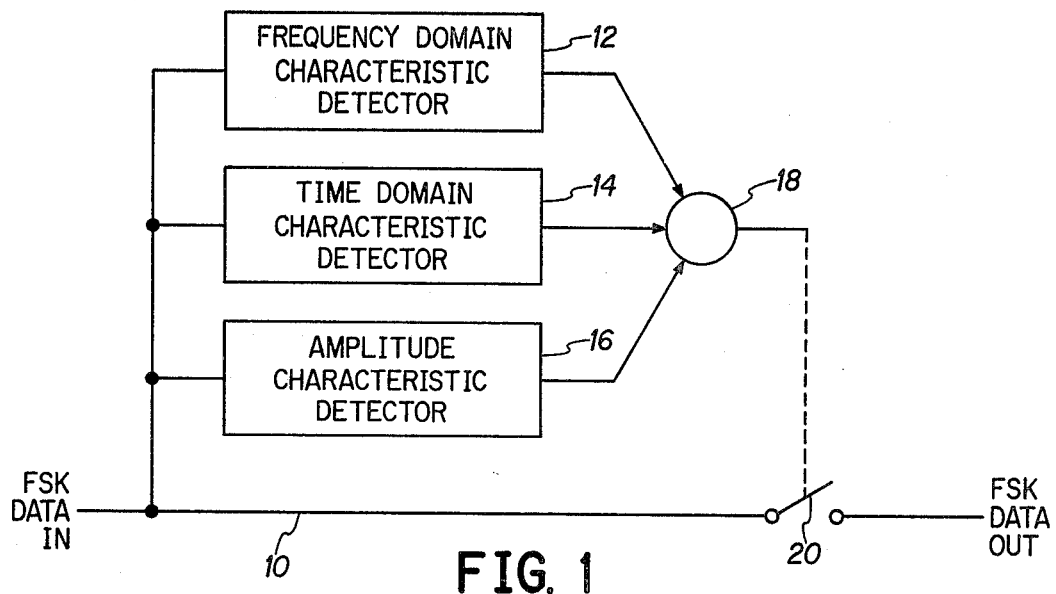
FIG. 1 is a block diagram illustrating the basic structure of the present invention.

FIG. 1 shows a Frequency Shift Key detector circuit for controlling, for instance, the transmission of FSK data on a transmission medium 10. The present invention is particularly characterized by providing a frequency domain characteristic detector 12, a time domain characteristic detector 14, and a amplitude characteristic detector 16. These detectors are designed to specifically react to particular frequency, time and amplitude characteristics of the FSK data so that, when all such characteristics are present, a summing network 18 produces a final indication of the presence of FSK data. This final indication is necessarily a more reliable indication of the presence of such data than circuits heretofore known in the art. Moreover, the parameters of each noted detector can be chosen according to the various nuances of the type of FSK data encountered.

Figure 2:
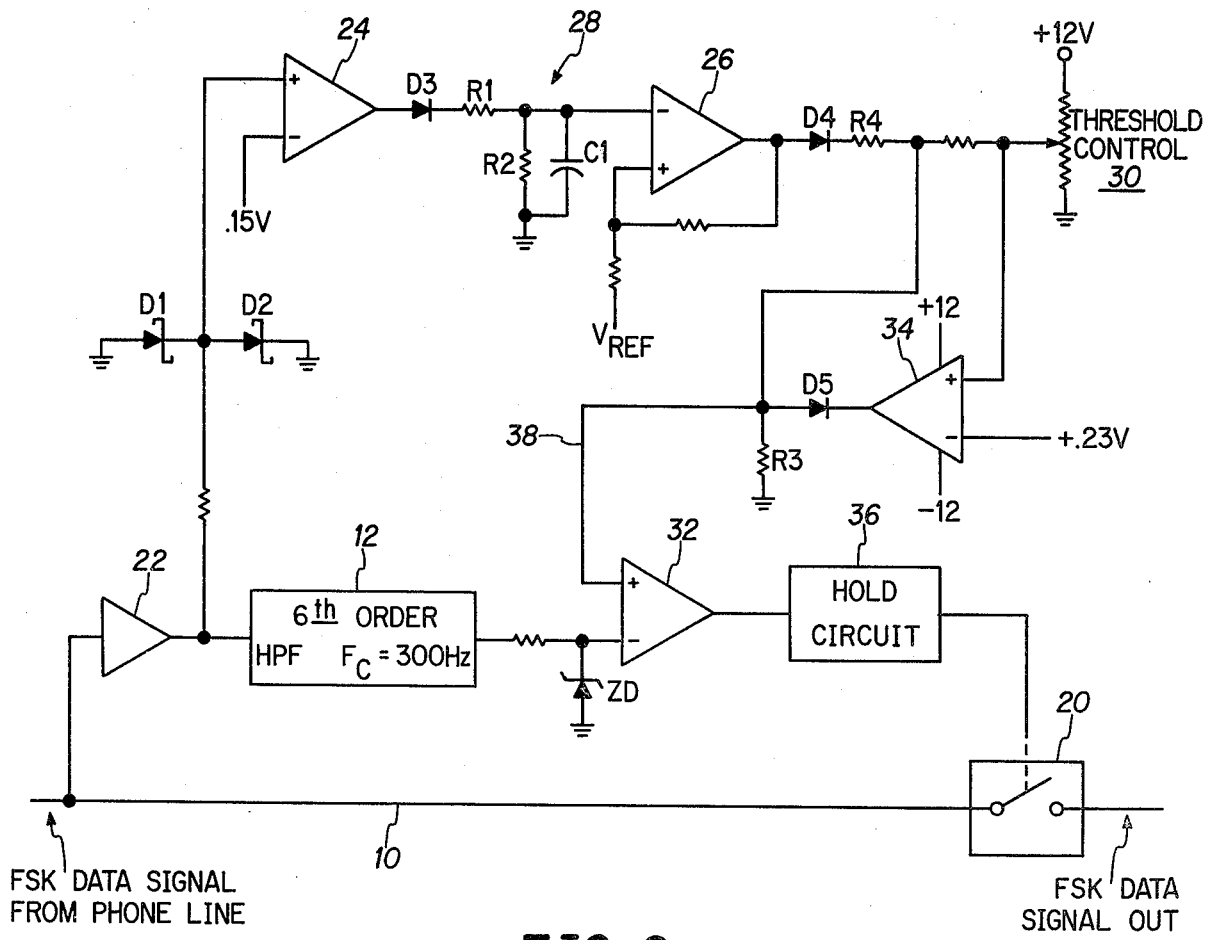
FIG. 2 is a schematic drawing of the preferred embodiment according to the present invention.

In the preferred embodiment, the summing network 18 operates an analog switch 20 such that the switch couples FSK data only upon the detection of parameters as noted above. Of course, the detector circuit can be used to control other appropriate circuits, as desired. Referring now to FIG. 2, there is shown the electrical circuit according to the preferred embodiment. The disclosed circuit, along with the various voltage levels indicated, is well suited for use in detecting voice band data signals having signal levels of $-20$ to $+0$ dBm (600 ohms). For ease of understanding, and for the noted input signal levels, the peak-to-peak voltage at the output of amplifier 22 is 0.88 ($-20$ dBm) to 8.8 (0 dBm) volts.

The transmission of FSK data on a telephone line is susceptible to power line frequency interference, especially the 180 Hz harmonic which is near the voice frequency band. To that end, a freqency domain characteristic detector 12, in the form of a sixth order high pass filter, is provided such that the circuit easily passes FSK frequencies but rejects frequencies below approximately 300 Hz by a roll off of 36 db per octave. Also, steady level interfering tones such as 60 Hz power are essentially eliminated by the filter and thus never reach the circuitry which follows. The design of such a sixth order high pass filter is known in the art, and will not be further delineated here. In brief summary, the filter 12 passes only those signals which have frequency characteristics representative of FSK data, and therefore indicative of the presence of such data.

Amplifier 24 and amplifier 26 comprise a part of the time domain detector. Schottky diodes D1 and D2 limit the signal amplitudes to the input of amplifier 24 to $\pm 0.3$ volts. Because the inverting input of amplifier 24 is biased at 0.15 volts, the amplifier output will be high for all signal amplitudes greater than 0.15 volts.

The integrating circuit 28, comprised of resistor R1, R2 and capacitor C1 provides a means by which the durational time aspect of the signal is measured. In other words, the presence of a signal, above the noted amplitude forward biases diode D3 and charges up capacitor C1 through resistor R1. The charge time constant is $[R1 \cdot R2/(R1+R2)] \cdot C1$. The discharge time constant is $R2 \cdot C1$.

The longer FSK data is present, the higher the voltage across capacitor C1 becomes. Amplifier 26 compares capacitor C1 voltage with a reference (Vref) and produces an output only after capacitor C1 charges up to a voltage exceeding Vref. The output of amplifier 26 produces a low dc voltage upon this event, which voltage is an indication of the presence of FSK data based upon a predetermined time domain characteristic. A low voltage at the output of amplifier 26 reverse biases diode D4 which then allows the amplitude determining circuitry to become operative.

The data message begins with a preamble consisting of a steady tone or a series of dummy (don't care) data symbols. The attack time of the time domain characteristic detector is set in accordance with the time duration of the message preamble. Large amplitude short duration noise or transient voltages do not produce indications at the output of amplifier 26. Also, short duration transients which may cause the filter 12 to ring (and produce false indications of data at the filter output) do not cause false keying of the switch 20 because the time domain characteristic detector prevents such transients from being propagated through the amplitude characteristic detector, as next described.

The amplitude characteristic detector 16, as shown in FIG. 1, is primarily comprised of a threshold control 30, and a comparator 32 of FIG. 2. It should be noted that comparator 32 has as one input, signals from the sixth order high pass filter 12. The high pass filter 12, not being amplitude sensitive, passes signals which may vary in amplitude to the extent allowed by the Zener diode ZD, to the amplitude comparator 32. The significance of diode ZD will be explained in more detail below.

The following discussion will assume that a bona fide FSK data signal is present and thus the putput of amplifier 26 is low, and the filtered frequency component of such signal appears at the inverting input of comparator 32. Further assume that the threshold control 30 is adjusted intermediate its minimum and maximum end points. In this situation, the output of amplifier 34 is high wherein diode D5 is reverse biased. Diodes D4 and D5 being reverse biased, allow the threshold voltage, as adjusted by the threshold control 30, to be applied to the noninverting input of comparator 32. Resistor R3, being a high impedance, does not substantially interfere with the level of this adjustable threshold voltage.

Diode D5 remains reverse biased so long as the threshold control 30 is adjusted to produce an output voltage higher than 0.23 volts (the voltage on the inverting input of amplifier 34).

Therefore, it should be understood that comparator 32 produces an output indication of those filtered frequency components which have amplitudes higher than the threshold voltage as adjusted by the threshold control 30. Furthermore, the output of comparator 32 is a combined indication of the simultaneous satisfaction of frequency, time and amplitude criteria. Efficiency in design allows the FSK signal frequency and amplitude indications to be applied to one input of comparator 32. Concurrently, satisfaction of the time domain aspects of FSK signal, as indicated by the output of amplifier 26, influences the threshold circuit by reverse biasing diode D4 to allow the threshold voltage, appearing at the other input of comparator 32, to be maintained as adjusted by threshold control 30. In the event the time domain constraints of the FSK signal are not met, the output of amplifier 26 goes high, forward biases diode D4, and forces the voltage on the non-inverting terminal of comparator 32 high. This input high prevents comparator 32 from producing an output indication of the presence of FSK data signals which may yet satisfy the frequency and amplitude constraints.

Yet another feature of the present invention relates to the threshold control circuit 30 and amplifier 34. This circuitry is responsive to a maximum threshold setting (+12 V) for forcing the comparator 32 to produce an output indication of the absence of FSK data—irrespective of whether any or all of the frequency, time or amplitude constraints are met. The threshold control circuit is comparably responsive to a minimum threshold voltage adjustment to force comparator 32 to produce an output indication of the presence of FSK data.

With the foregoing in mind, and considering first a maximum adjustment of the threshold control 30 toward +12 volts, it can be seen that the voltage on the non-inverting input of amplifier 34 exceeds the +0.23 volt bias on the inverting input thereby causing the output to be high and reverse bias diode D5. The amplifier 34 is thereby inoperative to influence the threshold voltage. Moreover, it is irrelevant whether amplifier 26 forward or reverse biases diode D4 since the only effect thereof is to aid the threshold voltage which is already at a high level preventing comparator 32 from responding to the output of the filter 12.

It is significant to note that Zener diode ZD is a 4.7 volt diode which limits signal swing to −0.6 to +4.7 VDC at the comparator input. This prevents even a strong (0 dBm) FSK signal from producing a comparator 32 output indicative of a data signal when the threshold control 30 is adjusted to approximately +12 volts.

Conversely, a threshold control 30 setting at the grounded end forces the output of amplifier 34 low to forward bias diode D5 and clamp the non-inverting input of comparator 32 to a voltage much more negative than −0.6 VDC. Amplifier 26 is ineffectual, because of resistor R4, in overriding this low voltage. Therefore, a minimum threshold control adjustment forces comparator 32 to produce an output low indicative of the presence of FSK data irrespective of whether any one or all of the frequency, time or amplitude constraints are met.

It is seen that there is provided circuitry for forcing an indication of the presence or absence of FSK data irrespective of whether such data is in fact present or absent.

It is preferable, when transmitting data, to provide a hold circuit 36 so that when comparator 32 produces an output indication of FSK data presence, the hold circuit will maintain that indication for a minimum period of time. This allows the switch 20 to remain closed between signal peaks in the transmitted data.

Figure 3:
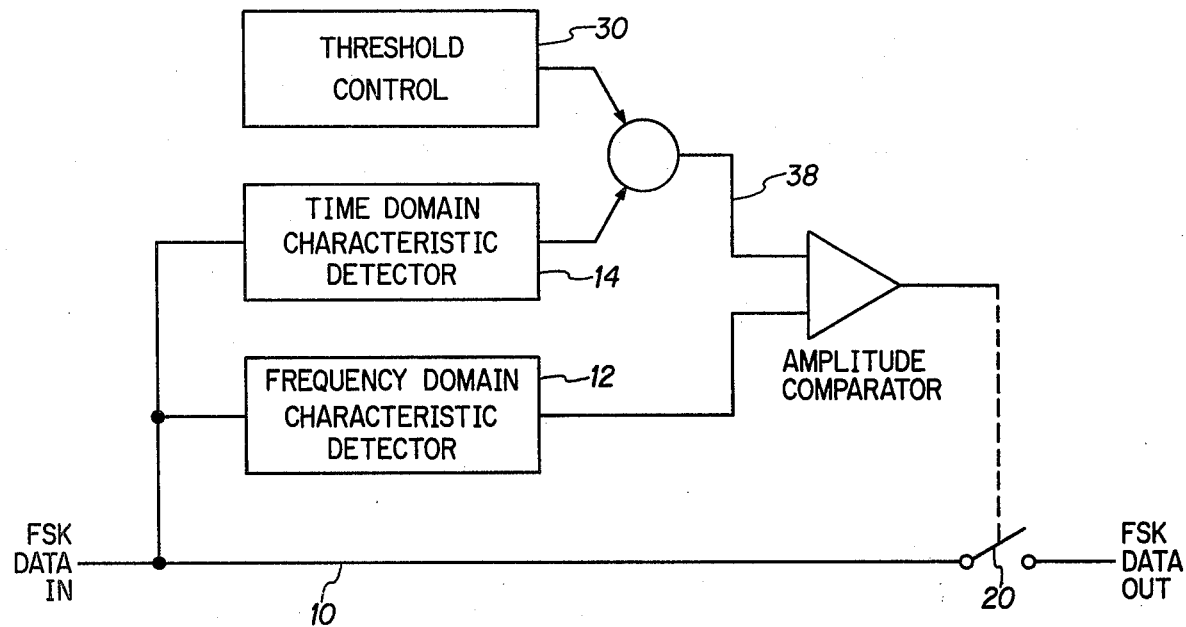
FIG. 3 is a block diagram illustrating the arrangement of functional blocks according to the preferred embodiment of the instant invention.

FIG. 3 illustrates the particular configuration of the various functional stages of the preferred embodiment of the invention as detailed in FIG. 2. The functional blocks of FIG. 3 achieve an efficiency in design by the interaction of the threshold control 30 and the time domain characteristics detector 14 to produce an output 38 which is compared with the amplitude of the signal emanating from the frequency domain characteristic detector 12.

Of course, other variations and arrangements of the noted detectors, to achieve specific efficiencies or results, may be devised by those skilled in the art. Although the preferred embodiment of the invention has been described in detail, it should be understood that various changes, substitutions and alterations can be made therein, without departing from the spirit and scope of the invention as defined by the appended claims.

What I claim is:

1. A data signal detector for detecting a data signal other than an amplitude modulated signal, comprising:
   means for detecting the frequency domain characteristics of said data signal so as to produce a first indication of the presence of said data signal;
   means for detecting the time domain characteristics of said data so as to produce a second indication of the presence of said data signal;
   means for detecting amplitude characteristics of said data signal so as to produce a third indication of the presence of said data signal; and
   means responsive to the presence of said first, second and third indications for producing a final indication of the presence of said data signal.

2. The data signal detector of claim 1 wherein said means for detecting the time domain characteristics of the data signal is comprised of means for producing said second indication when said data signal is present for a time exceeding a predetermined duration of time.

3. The data signal detector of claim 2 wherein said means for detecting the frequency domain characteristics of the data signal is comprised of a high pass filter.

4. A switch operated by data other than amplitude modulated data, for controlling the transmission of said data, comprising:
   means for detecting the frequency domain characteristics of said data so as to produce a first indication of the presence of said data;
   means for detecting the time domain characteristics of said data so as to produce a second indication of the presence of said data;
   a switch for controlling the transmission of said data; and
   summing means responsive to said first indication and said second indication for controlling said switch to enable transmission upon the detection of both said first and second indications.

5. The data operated switch of claim 4 further including:
   a comparator for comparing the amplitude of said data with a threshold voltage to produce a third indication when said amplitude exceeds said threshold voltage; and
   said summing means includes means responsive to said third indication.

6. The data operated switch of claim 5 further including:
   means for adjusting said threshold voltage above and below the amplitude of said data so that said comparator is operable to selectively produce said third indication, and
   means responsive to a threshold voltage above the amplitude of said data for disabling said switch so that it is inoperative to allow transmission of data irrespective of the amplitude thereof.

7. The data operated switch of claim 6 wherein said means responsive to a threshold voltage above the amplitude of said data includes means responsive to a maximum threshold voltage.

8. The data operated switch of claim 6 further including means responsive to a minimum threshold voltage, for enabling said switch so that it is operative to allow data transmission irrespective of the amplitude thereof.

9. A data detector for detecting a data signal other than an amplitude modulated signal, comprising:
   a filter for passing only desired data signals;
   a threshold voltage supply adjustable between a minimum and a maximum voltage;
   a comparator for comparing the amplitude of the filtered data signals with said threshold voltage to produce an indication of the presence of said data when the amplitude of said filtered data signals exceeds said threshold voltage;
   detector means for producing an output when said data is present for a time greater than a predetermined duration of time; and
   override means responsive to the absence of the output of said detector means for forcing the threshold voltage to a value so that said comparator does not produce an indication of the presence of filtered data.

10. The data detector of claim 9 wherein said detector means includes means for producing a dc voltage output when said data is present.

11. The data detector of claim 10 wherein said override means is coupled to said threshold voltage supply through a diode having the anode thereof poled toward said threshold voltage supply, whereby an output of said detector means causes said override means to back-bias said diode to thereby allow said threshold voltage to be compared with the amplitude of said filtered data.

12. The data detector of claim 11 wherein said threshold supply is comprised of a high impedance supply.

13. The detector circuit of claim 9 further including control means responsive to the voltage magnitude of said threshold voltage supply for controlling said comparator to:
   (a) produce an output indication of the presence of data in response to one of a minimum or maximum voltage magnitude of said threshold voltage supply, and
   (b) produce an out indication of the absence of data in response to the other minimum or maximum voltage magnitude.

14. In a data detector having a switch for controlling the transmission of said data and having a comparator for comparing the amplitude characteristics of data with an adjustable threshold voltage from a variable threshold voltage source to produce an indication of the presence of data when said amplitude exceeds the threshold voltage for controlling said switch, the improvement comprising:
   means responsive to a maximum threshold voltage from said variable threshold voltage source for forcing said comparator to produce an indication of the absence of data irrespective of whether said data is absent; and
   means responsive to a minimum threshold voltage from said variable threshold voltage source for forcing said comparator to produce an indication of the presence of data irrespective of whether said data is present.

15. The improvement of claim 14 further including means for limiting the amplitude of said data to a value not exceeding said maximum and minimum threshold voltages.

* * * * *